United States Patent [19]

Baker

[11] 4,297,690
[45] Oct. 27, 1981

[54] EARTHQUAKE ALARM SYSTEM

[76] Inventor: Gerald E. Baker, 23018 Arlington Ave., Torrance, Calif. 90501

[21] Appl. No.: 127,428

[22] Filed: Mar. 5, 1980

Related U.S. Application Data

[63] Continuation-in-part of Ser. No. 933,166, Aug. 14, 1978.

[51] Int. Cl.³ .............................................. G08B 21/00
[52] U.S. Cl. ................................. 340/690; 200/61.49; 200/61.51; 340/669; 340/689
[58] Field of Search ............... 340/690, 665, 566, 683, 340/689, 52 H, 669, 65; 200/61.49, 61.51, 61.48, 61.4 R

[56] References Cited
U.S. PATENT DOCUMENTS

| | | | |
|---|---|---|---|
| 893,997 | 7/1908 | Haas et al. | 200/61.51 |
| 2,311,637 | 2/1943 | Buchanan | 200/61.49 |
| 3,896,426 | 7/1975 | Laurent | 200/61.49 |
| 3,962,693 | 3/1976 | Schamblin | 340/584 |

*Primary Examiner*—Glen R. Swann, III
*Attorney, Agent, or Firm*—Singer & Singer

[57] ABSTRACT

An earthquake alarm system detects lateral impulse movements of a building or other structure and generates an audible sound as a result of the lateral detector moving beyond a preset limit. The lateral detector comprises a solid inertial mass that detects the lateral movement of the support as the measure of an impending earthquake. Electrical contacts associated with the mass and the support energize an audible circuit for generating an alarm to the occupants of the structure.

3 Claims, 6 Drawing Figures

EARTHQUAKE ALARM SYSTEM

CROSS-REFERENCE TO A RELATED APPLICATION

This is a continuation in part of patent application Ser. No. 933,166 filed Aug. 14, 1978.

BACKGROUND OF THE INVENTION

Field of the Invention

This invention relates to an earthquake alarm system for detecting lateral tremors indicative of an earthquake and generating an audible signal as a warning to the occupants when the preset limit of displacement detected by the equipment has been exceeded.

More particularly, this invention is concerned with a portable earthquake alarm system and method of adjustment that is readily atachable to the wall or beam member of a home or dwelling and usually located in the bedroom or living areas where people tend to congregate. The preferred method provides a control of sensitivity without disturbing the basic critical adjustments needed to perform the detecting function.

SUMMARY OF THE INVENTION

The heart of the invention is concerned primarily with an inertial mass element that is adapted to detect lateral movement between the mass and the relative supporting member.

The detecting device is distinguishable from a conventional pendulum support or other pendulous supported mass by rigidly or semi-rigidly attaching the support member holding the mass to the base member so as to prevent a pendulous action.

In one embodiment an inertial mass is supported vertically by a solid steel support that is solidly anchored to a support member to thereby physically prevent a pendulous action. The support member may be located above the inertial mass or below the inertial mass. A lateral movement of the support member indicative of an earthquake will result in lateral movement of the support member with the inertial mass maintaining an essentially stable position.

A ring member attached to the supporting member and encircling the inertial mass has approximately three adjustable electrical contacts facing the inertial mass. The distance between the adjustable contacts and the inertial mass is indicative of the allowed relative movement between the support and the inertial mass and may be adjusted to preset the sensitivity of the earthquake alarm system.

In a second embodiment an inertial mass is supported by a solid member which is hung from a supporting member by means of a concave support that essentially prevents a pendulous movement of the inertial mass. Located on the bottommost portion of the inertial mass is an opening in the shape of a parabola adapted to accept an adjustable probe.

Movement of the probe in a vertical direction either up or down will vary the lateral distance between the probe and the sides of the parabolic opening.

In the event of an earthquake, the support member will move laterally with respect to the inertial mass causing a displacement between the concave support member holding the inertial mass and supported from the overhead. The size of the concave support will determine the force necessary to displace the support and cause a relative movement between the inertial mass and the support. Relative movement will cause the inertial mass to contact the probe thereby closing an electrical circuit with an audio generating device setting forth an audible alarm to the occupants.

The audible alarm is conventional in nature and may be either battery operated or power operated from the power supply to the dwellinghouse.

DESCRIPTION OF THE PRIOR ART

A review of the prior art has failed to disclose earthquake alarm systems of any kind for warning occupants of a dwelling of an impending catastrophe.

The prior art does disclose many magnetostriction seismometers used in connection with drilling an exploratory work for measuring earth movements. Such devices include U.S. Pat. No. 2,643,367 issued to Cruzan, U.S. Pat. No. 3,286,229 issued to Millis, and U.S. Pat. No. 3,199,072 issued to Willmore. These patents are cited simply to show the state-of-the-art of lateral measuring devices only.

Other devices characterized as motion detectors and used to detect the presence of intruders in a dwellinghouse are characterized by U.S. Pat. No. 3,962,693 issued to Schamblin. Such devices are pendulous supported masses that are adapted to swing as a pendulum and hence are not adapted to measure and detect lateral impulse movement as is required in the earthquake alarm system.

Similarly, a tilt control device, U.S. Pat. No. 3,359,550 issued to Christensen illustrates an interesting system for measuring the tile of a member by measuring the movement of a pendulous supported mass from a free pivoting overhead support. Again, these devices require a free pivot at the supporting mechanism and are certainly not adapted to measure lateral impulse signals as is required by the earthquake alarm system.

In either the first embodiment or the second embodiment, the critical dimension from the pivoting point to the inertial mass is preset at the factory as a result of carefully calibrated instruments. This critical distance is then fixed and not subject to adjustment by the ultimate user.

The actual user may adjust the sensitivity of the instrument by enlarging or diminishing the lateral distance that the mass is allowed to move and without moving the position of the mass once the critical dimension between support and mass is fixed and determined.

In all of the prior art systems evaluated it is always necessary to move the mass and destroy the critical distance from the support to the mass thereby disturbing the inertial balance and for all practical purposes rendering the instrument useless for the intended purpose of measuring earthquake movement.

Further objects and advantages of the present invention will be made more apparent by referring now to the accompanying drawings wherein:

DESCRIPTION OF THE PREFERRED EMBODIMENTS

Figure 1:
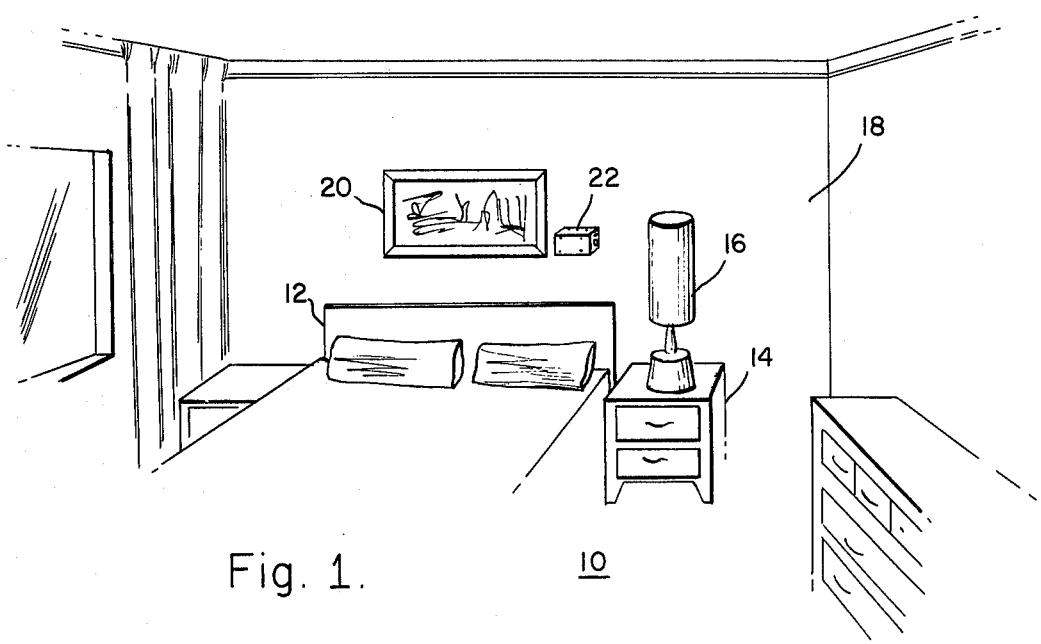
FIG. 1 illustrates the invention in the conventional bedroom of a dwellinghouse.

Referring now to FIG. 1, there is illustrated a conventional bedroom scene 10 comprising a bed 12, night table 14, lamp 16, wall 18, with a picture 20 attached to the wall.

Located over the bed 12 and close to the picture 20 is an earthquake alarm system 22 constructed according to the teachings of this invention.

Modern technology now tells us that earthquakes are basically formed as a result of plate movements located on the surface of the earth. These plate movements we are informed move at a varying rate and account for the general movement of the continent and the varying earthquake activity occurring throughout the world.

In the Los Angeles region we are informed that Los Angeles is located on a plate that is moving northward and will eventually place Los Angeles in a position close to San Francisco.

The scientists inform us further that as a result of the plate movement, there is generated frictional forces between adjacent plates in areas that are generally known as faults. Frictional forces along the fault between opposing plates tend to restrict the movement of abutting plates for a period of time. Unfortunately the forces driving the plates are enormous and continue to be exerted at the faults areas generating pressures and even bulges in the countryside which can be measured and detected.

These bulges are continually monitored and the frictional forces in the fault are continually monitored and relayed to the public as a means of informing the public periodically that an earthquake or other seismic disturbances is about to take place.

Unfortunately, the science of predicting earthquakes is only in its infancy and there is as of this time no clear and consistent earthquake prediction service available to the public.

The earthquake alarm system disclosed in the present invention is intended to fill this gap by measuring and detecting the initial lateral impulse movement caused by an impending earthquake and to generate an audible signal as a warning to the occupants to take some action to protect their life or property. The electronics is basically similar to smoke alarm detectors and in the preferred embodiment the same audible and electrical systems are used. A detected horizontal movement is detected causing an electrical contact to be closed, thereby closing a circuit to the audio generating device. In the event of false alarms or malfunctioning circuitry or equipment, there is provided a reset switch to reset the equipment and turn the audible sound off is such is required.

The installation of the earthquake alarm system 22 must be physically attached to the wall member 18 and in a preferred level position.

Figure 4:
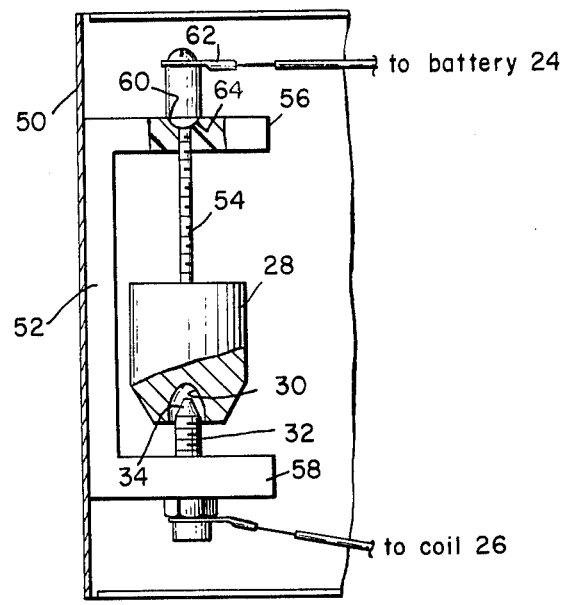
FIG. 4 illustrates a first embodiment of a lateral movement detector.
Figure 2:
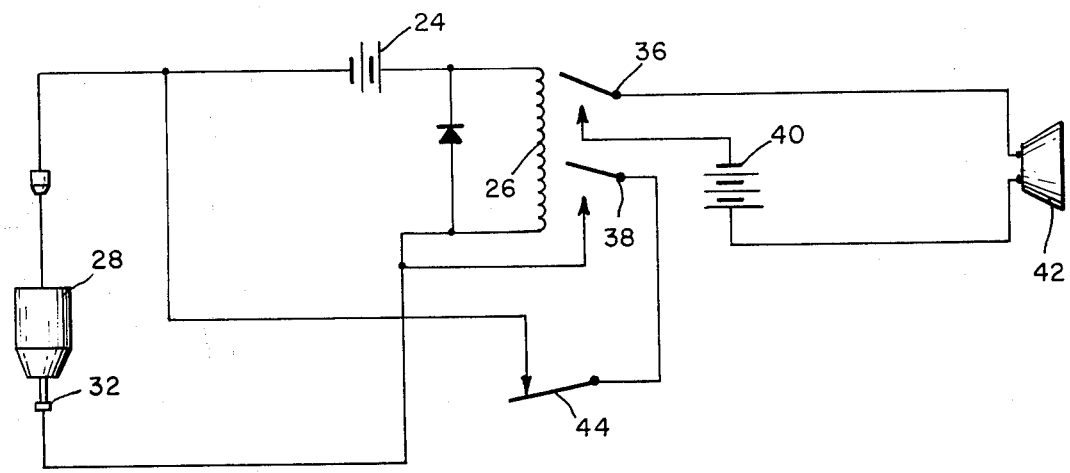
FIG. 2 is a schematic diagram illustrating a self-contained earthquake alarm system.

Referring now to FIG. 2, there is shown a schematic diagram of the earthquake alarm system 22 comprising a battery 24 connected in circuit with a double pole single throw relay 26. Closing the electrical circuit between the battery 24 and the coil of relay 26 is an electrically conductive inertial mass 28 having an opening 30 in the lowermost portion in the shape of a parabola as shown in FIG. 4.

A probe adjustable in a vertical direction and attached to a support member is adapted to project into the parabola opening 30 so as to electrically contact the mass 28 in the event there is relative movement between the mass and the probe 32. Movement of the probe 32 in a vertical direction has the effect of changing the lateral distance between the tip of the probe 34 and the parabola surface 30 of the mass 28. In this fashion moving the probe vertically into or out of the parabola opening 30 has the effect of varying the horizontal distance between the tip of the probe 34 and the mass 28 thereby providing the operator with an adjustment to determine the sensitivity of the lateral force to be detected.

The probe 32 is connected in circuit with the cell associated with relay 26 so as to energize the coil in the event the mass 28 touches the probe 32.

Contacts 36 and 38 are controlled by the coil of relay 26 and will close when the circuit is energized. Contacts 36 are in circuit with the battery 40 and an audio generating device 42 of the type generally associated with smoke alarm systems.

Contact 38 is connected in circuit with a single pole single throw switch 44 which is placed in parallel with the series combination of battery 24 and relay 26 thereby effectively paralleling the inertial mass 28 and holding the relay 26 in a closed position once it is energized.

The single pole single throw switch 44 may be operated by the user in the event the alarm is prematurely energized for whatever the reason. Opening the switch 44 removes the hold from coil 26 thereby allowing the coil to be de-energized opening contact 36 which will stop the horn 42 from being energized and opening contact 38 will remove the hold from the coil associated with the relay 26.

Figure 3:
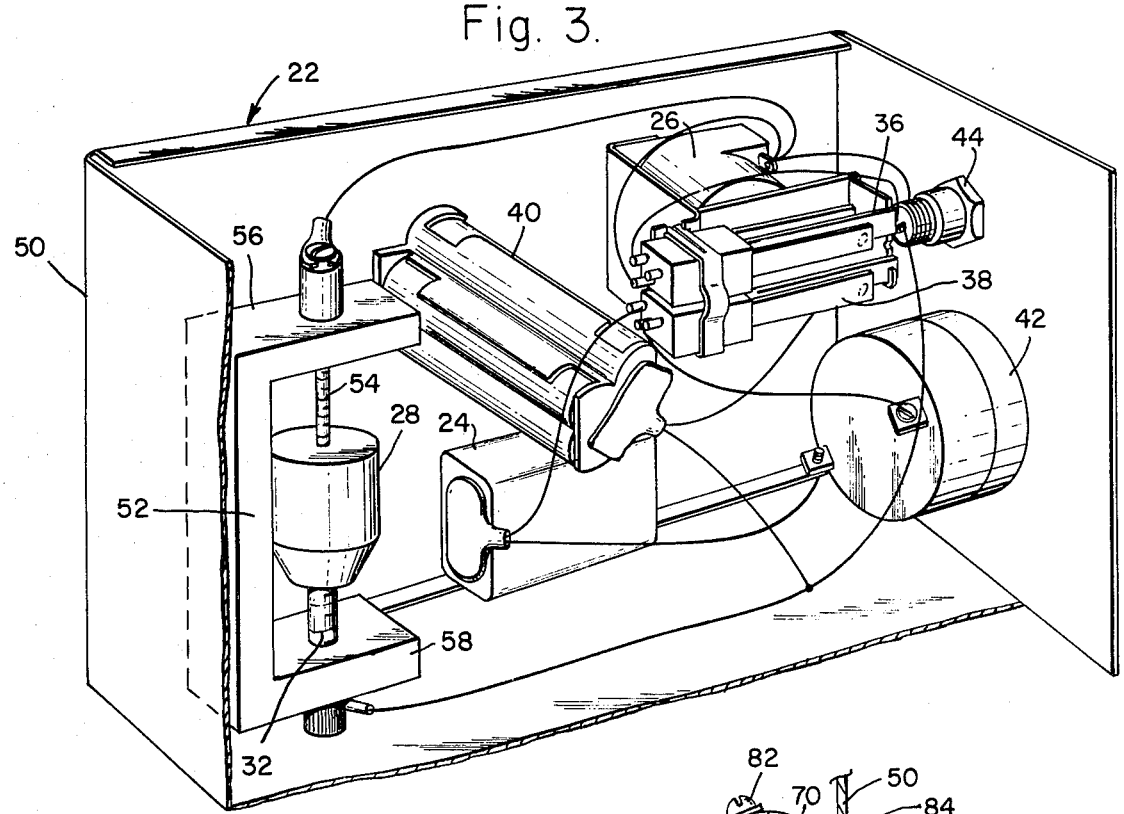
FIG. 3 illustrates the internal connection and placement of parts of a system illustrated in FIGS. 1 and 2.

Referring now to FIG. 3, there is shown a pictorial representation of the alarm system 22 illustrated in FIGS. 1 and 2. Where appropriate, similar numbers have been used in order to provide continuity between the elements already described and their placement within the box 22.

In the preferred emodiment the system is assembled in an enclosed container 50 which is physically supported by conventional bolting mechanisms to the wall of the dwellinghouse. Located on face of the container 50 and available to the operator is the horn 42 and the single pole single throw shut-off switch 44. The inertial mass 28 is electrically conductive and is vertically mounted to an insulative U-shaped support member 52. The inertial mass 28 is supported by a solid member 54 from the uppermost leg 56 of bracket 52.

The probe 32 is physically attached to the lowermost leg 58 of bracket 52. The probe 32 is inserted into the parabolic opening 30 located in the inertial mass 28 and which is more fully illustrated in FIGS. 2 and 4.

The installation of the device 22 should be made as solidly as possible to the supportive wall member and preferably should be in a horizontal position. It is envisioned that trial and error will determine the preferred adjustment for the probe 32 when inserted into the opening in the inertial mass 28. It is recognized that different buildings have different supports and different vibration factors that will transmit vibration and forces from the street and surrounding areas. It is for this reason that the inertial mass cannot be a pendulous supported mass since normal vibratory forces will simply induce a swaying which is typically not associated with an earthquake generated force which is primarily lateral in nature.

It is recognized that sustained and repetitive earthquake forces may result in synthetic vibrations, however, such vibrations are not the direct result of the initial force and it is the purpose of the present invention to detect the early initial force to give as much time as possible to the occupants rather than detect the resultant oscillations which may or may not have been caused by earthquake related forces.

Referring now to FIG. 4, there is shown in greater detail the first embodiment of the inertial mass 28 more fully illustrating the parabolic opening 30 and the adjustable probe 32 which is movable in a vertical direction into and out of the opening 30. Support member 54 is physically attached at the lowermost end to the mass 28 and at the upper end is attached to convex bearing member 60 which eventually forms an electrical contact 62 which is connected to battery 24 illustrated in FIG. 2.

The convex surface 60 is adapted to nest within a concave cavity 64 located on upper leg 56 associated with bracket 52. The mating of the concave surface 64 and convex surface 60 associated with the support for the inertial mass 28 imposes a frictional force between the mass and the support leg 56 thereby preventing the inertial mass from freely moving as a pendulum.

This restriction against pendulous movement is required in order to prevent normal building movements and oscillation forces not associated with lateral impulse forces generated by earthquakes from affecting the relative movement between the inertial mass 28 and the probe 32. In the preferred embodiment the metal convex surface 60 is made to contact the plastic concave surface 64 associated with leg 56. It will be recognized that bracket 52 comprised of upper leg 56 and lower leg 58 must be an insultative member in order to prevent the coil 26 from being energized without movement of the inertial mass 28.

It will be appreciated therefore that the critical distance between mass 28 and the pivotal support between convex surface 60 and concave cavity 64 is fixed and hence not subject to change by the ultimate user.

The user changes the sensitivity by moving probe 32 in a vertical position either in or out of the cavity 30 thereby changing the lateral spacing between the end of the probe 32 and the surface of the cavity 30. This sensitivity adjustment is made without changing the critical position between the mass 28 and the pivotal support as previously described.

Figure 5:
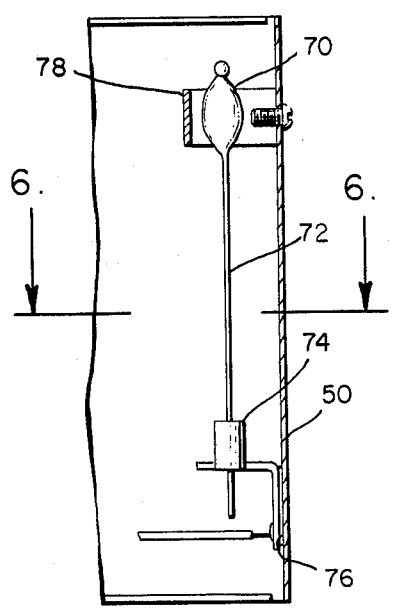
FIG. 5 illustrates a second embodiment of a lateral movement detector.

Referring now to FIG. 5, there is shown another embodiment of a horizontal impulse detecting system comprising an inertial mass 70 attached at one end to a rigid support 72 which in turn is fixedly attached at the other end to a support bracket 74. Support bracket 74 is connected through an insulator 76 to wall member 50 associated with the device 22. Electrical contacts are made to battery 24 from the electrically conductive support 74.

Figure 6:
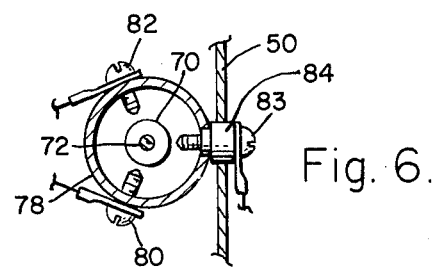
FIG. 6 illustrates the ring and adjustable electrical contacts surrounding the inertial mass illustrated in FIG. 5.

The critical distance between mass 70 and support 74 is fixed and not subject to variation by the user in the field. The user may control the sensitivity of the device by varying the lateral spacing between the ring 78 and the mass 70. Preferably this is accomplished by varying the penetration of contacting points 80, 82 or 83 as shown in FIG. 6. Varying the lateral displacement will vary the sensitivity without changing the critical distance between the mass 70 and the supporting position as at 74.

Referring now to both FIG. 5 and FIG. 6, there is shown a ring 78 fixedly attached to wall 50 and completely encircling the inertial mass 70. Located on the ring are three adjustable contacting points all electrically connected together and connected to coil 26 to complete the circuit.

In the preferred embodiment adjustable contacting points 80, 82 and 83 are each located 120 degrees from each other so as to provide maximum freedom in adjusting the sensitivity for determining when relative movement between the inertial mass 70 and the contacting points should trigger the alarm.

Contacting point 83 is also a mounting screw through insulator 84 to wall 50 of the device 22. The cover 50 could be made a conducting element as shown in FIG. 5; however, in the interest of eliminating stray currents it is thought best to use the insulative member 84 as shown in FIG. 6 and thereby ensure that all carrying currents are in defined wires and not in ground members.

A review of FIG. 5 will show that mass 70 should be located in a vertical position for proper operation. The vertical position may include mass 70 in the uppermost position or in the lowermost position since it will be apparent that mass 70 does not hang from a support but is otherwise physically supported by bracket 74 to wall 50.

I claim:

1. An earthquake alarm comprising:
    a member having a referenced support at one end,
    a mass attached at the opposite end of said member a fixed distance from said referenced support,
    said mass being supported to have a preferred vertical position for a movement in a lateral direction only,
    adjustable mechanical detecting means for limiting the impulse lateral movement of said mass without changing the fixed distance of said mass from said referenced support,
    said mass being cylindrical and containing an opening at the lowermost end for accepting a vertically aligned adjustable probe attached to said mechanical detecting means and adapted to be selectively located in said opening without touching said mass, and
    electrical means connecting said mechanical detecting means with an audio generating device for translating selected impulse movement of said mass into an audible signal.

2. An alarm system according to claim 1 in which said probe is adjustable in a vertical position and has a variable diameter that differs from the diameter of said opening in said mass for varying the radial distance between said probe and said mass as said probe is inserted in said opening.

3. An alarm system according to claim 1 in which said mass and said probe are electrically conductive and cooperate with said electrical means for energizing said audio generating device on said probe contacting said mass.

* * * * *